（12） United States Patent
Streuter et al.

(10) Patent No.: US 12,105,792 B2
(45) Date of Patent: Oct. 1, 2024

(54) PERSONAL LAUNCH CODE (PLC) CREATED BY AN ACCOUNT OWNER AND INCLUDED WITHIN THE CREATION OF A DEVICE IDENTIFICATION CODE DEFINING THE IDENTITY OF A COMPUTING DEVICE SEEKING ACCESS TO ACCOUNTS

(71) Applicants: Gary William Streuter, Laguna Niguel, CA (US); William Pat Price, Lake Havasu City, AZ (US)

(72) Inventors: Gary William Streuter, Laguna Niguel, CA (US); William Pat Price, Lake Havasu City, AZ (US)

( * ) Notice: Subject to any disclaimer, the term of this patent is extended or adjusted under 35 U.S.C. 154(b) by 214 days.

(21) Appl. No.: 17/656,648

(22) Filed: Mar. 27, 2022

(65) Prior Publication Data
US 2022/0309148 A1    Sep. 29, 2022

Related U.S. Application Data

(60) Provisional application No. 63/167,145, filed on Mar. 29, 2021.

(51) Int. Cl.
*G06F 21/45* (2013.01)
*G06F 21/60* (2013.01)
*G06F 21/62* (2013.01)
*G06F 21/73* (2013.01)

(52) U.S. Cl.
CPC ............ *G06F 21/45* (2013.01); *G06F 21/602* (2013.01); *G06F 21/62* (2013.01); *G06F 21/73* (2013.01); *G06F 2221/2141* (2013.01)

(58) Field of Classification Search
None
See application file for complete search history.

(56) References Cited

U.S. PATENT DOCUMENTS

2020/0162450 A1 * 5/2020 Yarabolu ............ H04L 63/0807

* cited by examiner

*Primary Examiner* — Brian Whipple
(74) *Attorney, Agent, or Firm* — Law Office of Scott C Harris

(57) ABSTRACT

A Personal Launch Code (PLC) known only by the rightful account owner becomes an included element within the construction of an Anonymous Access Key (AAK) used to validate and authenticate digital account access and whereby said PLC is never stored for matching against another representation of said PLC.

8 Claims, 2 Drawing Sheets

PERSONAL LAUNCH CODE (PLC) CREATED BY AN ACCOUNT OWNER AND INCLUDED WITHIN THE CREATION OF A DEVICE IDENTIFICATION CODE DEFINING THE IDENTITY OF A COMPUTING DEVICE SEEKING ACCESS TO ACCOUNTS

CROSS REFERENCE TO RELATED APPLICATIONS

The present invention is related to application Ser. No. 14/717,352, now granted U.S. Pat. No. 9,691,067, which is considered copied herein in its entirety.

This application claims priority from Provisional Application No. 63/167,145, filed Mar. 29, 2021, the entire contents of which are herewith incorporated by reference.

FIELD OF INVENTION

The field of invention relates to providing digital access security for Internet accounts, Internet of Things (IoT) devices, physical access to places & things and operating systems/applications. A Personal Launch Code (PLC) is created by the rightful account owner and said PLC becomes part of a device identification key, known as an Anonymous Access Key (AAK), that is created from specific device identifiers drawn from a computing device and is used to authenticate the identity of computing devices seeking to access protected accounts, locations, or devices.

BACKGROUND

In the cyber world we live in, the issue of digital security has risen to new heights of awareness and concern. This can range from the security of your financial and personal data to even issues of physical security. The concept of right to enter and authorized access are under siege from relatively new innovations such as the Internet, that has made information available to anyone with the simple press of a button. Want to know something—just Google™ it!

As wonderful as the connectivity we enjoy today is, it has also opened many avenues for hackers and criminals to exploit our personal & financial information, as well as our private data and even access to secure physical locations. With the invention described in this disclosure, the inventor's goal is to provide the rightful owners of data, accounts, applications, and property with an identification method that protects access to their private information, accounts and physical locations. The invention referred to in this disclosure, as a Personal Launch Code (PLC), is a remembered sequence of characters and/or numerals and/or symbols known only to the rightful account owner, and said PLC is included as an identifier within the creation of the unique Anonymous Access Key (AAK) that is composed of random physical and digital identifiers which are drawn from, and represent the identity of a computing device that initiates an access request for personal information, private data or physical locations.

It should be clearly understood that a major consideration in the creation of the unique Anonymous Access Key (AAK) is "chance"—the interlacing of randomness within the creation of said AAK. Hackers and bad actors often prey on patterns in behavior they can use to exploit and access a user's account. The use of random selection of identifiers within the construction of the Anonymous Access Key (AAK), combined with random sequencing, random offsets and random SALT application eliminates the patterns that hackers so often exploit. The injection of the Personal Launch Code (PLC) into the construction of the AAK is another example of our use of randomness in building a key that can withstand even brute force hacking attacks.

The methods described in this disclosure are used to integrate a Personalized Launch Code (PLC) within the creation of said Anonymous Access Key (AAK), which provides unique validation and authorization of access requests from computing devices seeking access by creating a unique digital identity key that is drawn from hardware and software identifiers present in said computing device seeking access and combined with the rightful account owners Personal Launch Key (PLC) which is used within the creation of said AAK. Said Anonymous Access Key (AAK) is then used to validate the identity of said computing device that is initiating the access request and determine if said computing device has previously been authorized for use in this transaction by the rightful owner of the account. The creation process of an Anonymous Access Key is fully explained in our granted U.S. Pat. No. 9,691,067, which is considered copied herein in its entirety.

The inventors consider this invention to be an important development in providing true multi-factor access security. By integrating the Personal Launch Code (PLC), known only to the user, within the creation of the Anonymous Access Code (AAK) when a computing device is authorized for access, the invention creates an access authentication method that is based not only on something the rightful account owner has—i.e., their authorized computing device, but also something the rightful account owner knows—their selected Personal Launch Code (PLC). The inclusion of something known only to the rightful account owner within the access authorization process adds another variable to that access authorization—a Personal Launch Code (PLC) that is not stored or subject to any form of matching against a previously registered value and is only known by the rightful account owner.

It is also important to note that the Personal Launch Code (PLC) created by the rightful account owner for integration into the construction architecture of an Anonymous Access Key (AAK) is never stored on the users computing device and is securely erased from the cloud-based validation service upon completion of inserting the PLC into the Anonymous Access Key construction architecture.

The inventors have studied the current methods of providing a personal identification marker to the account access process. Personal Identification Numbers (PIN), common and enhanced password routines, and even Bio-Metric markers all share one common practice—a practice that often leads to breaches of accounts protected in this manner.

That common factor is the necessity of matching the PIN, password, or Bio-Metric marker known by the user against a stored value of said PIN, password or Bio-Metric marker created when the account is created or refreshed. This real-time matching function takes said user inputted PIN, password or Bio-Metric marker and compares it to the value stored in either the computing device seeking access or stored within the website or account being accessed. The need for these other personal identification markers to perform this matching function creates the opportunity for hackers to gain unauthorized account access by breaching the location in which said matched PIN, password or Bio-Metric marker values are stored for comparison to the real-time PIN, password or Bio-Metric marker input made by the user seeking account access.

Because the Personal Launch Code (PLC) does not require a stored value to compare with, this avenue of breach is no longer available to the hacker. When a user seeks access to an account protected by an Anonymous Access Key (AAK) created with an incorporated Personal Launch Code (PLC), they are asked to input the PLC that was used when their user account was created, or their computing device was authorized for access. The PLC entered by the user is NOT matched to ANY stored value. The information entered for the PLC is accepted as entered and is integrated within the defined build sequence for the Anonymous Access Key (AAK). Because said PLC is not matched to any stored marker, there is no verification of its accuracy. However, the beauty to the concept of the PLC is that an inaccurate entry of a PLC into the AAK build process results in the generation of an AAK that is invalid, and thus not accepted for account access. Because the Personal Launch Code (PLC) is simply one element, integrated within the creation of said AAK, the PLC's identity requires no matching function to a stored marker. Said PLC is simply an integrated part of the overall AAK and the overall identity of said AAK is what is matched to the AAK value created and stored by the validation service at the time of computing device registration. Thus, said PLC becomes a part of a mixed value and as such, is not subject to being matched.

It should be noted that inclusion of the Personal Launch Code (PLC) within the construction architecture of the Anonymous Access Key (AAK) can be specified as "optional feature" and thus said PLC may not be included within the AAK.

Problem Statement

The identity and authorization of computing devices seeking to connect to Internet websites and networks is easily compromised and subject to unauthorized access. Access security is often based on nothing more than a username and password, or inadequate two-factor authentication. What is needed is systems and methods that can validate the identity of both the user and device seeking to connect to and gain access.

SUMMARY OF THE INVENTION

The intent of the present invention is to provide a factor known only to the rightful owner of an account and said known factor is included within the construction of a unique identification key, known as an Anonymous Access Key (AAK), that can be used to authenticate access requests to accounts, secure data, networks or even physical places and things.

This factor, referred to in this disclosure as a Personal Launch Code (PLC) is an element that is only known in the mind of the rightful account owner. Said PLC may include as many characters, numbers or symbols as the owner wishes to use. It is important to note that in a major difference to a traditional password, there is no need to create a complex PLC, comprised of a long series of characters, numbers, or symbols. Because the PLC has no matching value on its own it cannot be used for account access without its inclusion as one element within the construction of the Anonymous Access Key (AAK) which represents the unique identity of the computing device seeking access. Thus, even if bad actors were able to obtain the users PLC, it is useless to them unless they also have access to the users registered computing device.

The current construction architecture of the Anonymous Access Key (AAK) operates in this manner. A first software program, known as a client agent, is resident and operating on a computing device that is known and approved by the rightful owner of an account. Said client agent, during the computing device validation process, collects various hardware and software identifiers from said computing device upon which it is installed, and forwards said identifiers to said online validation service. Said validation service constructs a unique identification and validation key (AAK) from these hardware and software identifiers and said AAK validation key acts as a digital access key for the account authorization process required for gaining access.

The present invention adds the optional requirement for the inclusion of a Personal Launch Code (PLC) within the construction architecture of the Anonymous Access Key (AAK). If the Personal Launch Code (PLC) is required within the construction architecture of the Anonymous Access Key (AAK), the PLC is inputted with each AAK construction request by the rightful account owner. The request to user for inputting of the PLC may be generated by said first software program, known as the client agent and operating on said computing device or the user may be requested to enter said PLC directly by the online validation service. In either case, if the PLC is required and if entered by the rightful account owner it is included within the construction architecture of the Anonymous Access Key (AAK).

The use of a Personal Launch Code (PLC) inputted by the rightful account owner hardens the authentication of the identity of a computing device being used to initiate an access request to an account. The Personal Launch Code (PLC) adds a personal factor—something only known to the rightful account owner. This ensures that an account access request coming from a computing device that has been previously registered AAK in the online validation service, must have the correct PLC inputted by the rightful account owner to gain account access. Even if a hacker/criminal has an account owner's complete personal and financial data, including their username, password or a forced biometric marker, the access request will not be approved unless it is being initiated by a computing device which is properly registered in the online validation service and said computing device is validated with the correct PLC integrated within said AAK upon each access request. This invention provides a huge step forward in achieving security by greatly enhancing and expanding the definition and use of multi-factor authentication techniques to reduce the scale of fraudulent transactions.

Dictionary:

Anonymous Access Key (AAK): Refers to computing device authentication key constructed from specified distinctive identifiers collected from a computing device, as taught in application Ser. No. 14/717,352 now issued U.S. Pat. No. 9,691,067.

Anonymous Data: Data that cannot be associated on its own with the identity of the computing device that spawned the data, nor the protected account that requested said data.

Applications/Operating Systems/Secure Data: This refers to software programs and secured data that are resident on a local computing device which also is the device executing the first software program client agent.

Client Agent: A first software program executing on a computing device. The client agent initiates a validation of said computing device by collecting a set of specified distinctive identifiers from said computing device that is initiating an account access transaction and is part of an authorization/access process. These extracted values are submitted to an online validation service server for matching with the values previously stored in said online validation service during the computing device registration process.

Collected Distinctive Identifiers: The process whereby said first software program defined in this disclosure extracts with each access request, the specified distinctive identifiers from said computing device that is initiating an access transaction as part of an authorization/access process. These extracted values are submitted to an online validation service for matching with the values previously stored in said online validation service during the registration process to validate the identity of a computing device seeking account access.

Internet of Things (IoT): This refers to physical devices that are network connected mechanical/electrical devices. Examples of this may be, but are not limited to, security cameras, video doorbells, outlet sensors, access doors/gates and appliances.

Online Validation Service: A remote service that manages the construction architecture used to create an Anonymous Access Key (AAK), including a Personal Launch Code (PLC) and stores said AAK in a database of registered Anonymous Access Keys that were created based on specified distinctive identifiers drawn from computing devices.

Password: A code typically only known by the rightful account owner and a transaction certifying authority and matched after input to a stored value.

Personal Launch Code (PLC): A code known only to the rightful account owner that may consist of alpha characters, numbers, symbols, or bio-metric markers and may be expressed in a simplistic or complex pattern and is integrated into the construction of an Anonymous Access Key (AAK)

Registration: The process whereby a first software program installed on a computing device completes an initial process of collecting specified distinctive identifiers from said computing device and transmits those values to a registration software program residing on said online validation service, which then inserts these values with a Personal Launch Code (PLC) into an online validation database of computing devices authorized for account access.

Secure Element: Used to denote devices, accounts, data or places that are secured and may be addressed by this invention.

Specified Distinctive Identifiers: A group of defined serial numbers and/or other digital characteristics, which may be considered unique, collected by a first software program from hardware and software modules resident on a computing device and for purposes of this disclosure, may also include a unique string of data inputted by the account owner, such as a password or biometric marker, and/or a unique identification number assigned to said first software program.

Transaction: For purposes of this disclosure, the term transaction may refer to general transaction requests such as validating a computing device, or requests for access.

Unique Identification Number: A unique recognition number that may be assigned to said first software program and which may be included in the collected specified distinctive identifiers.

Unique String of Data: A collection of data such as passwords or biometric markers that are inputted into a computing device by an account owner and may be included in the specified distinctive identifiers supplied to the online validation service for matching.

Validation Request: A request to a computing device to reissue specified distinctive identifiers and whereby said reissued values are matched against the registration values that are in an online validation service in order to validate the identity of a local computing device that initiated the transaction that spawned the validation request.

DETAILED DESCRIPTION

Embodiments

Figure 1:
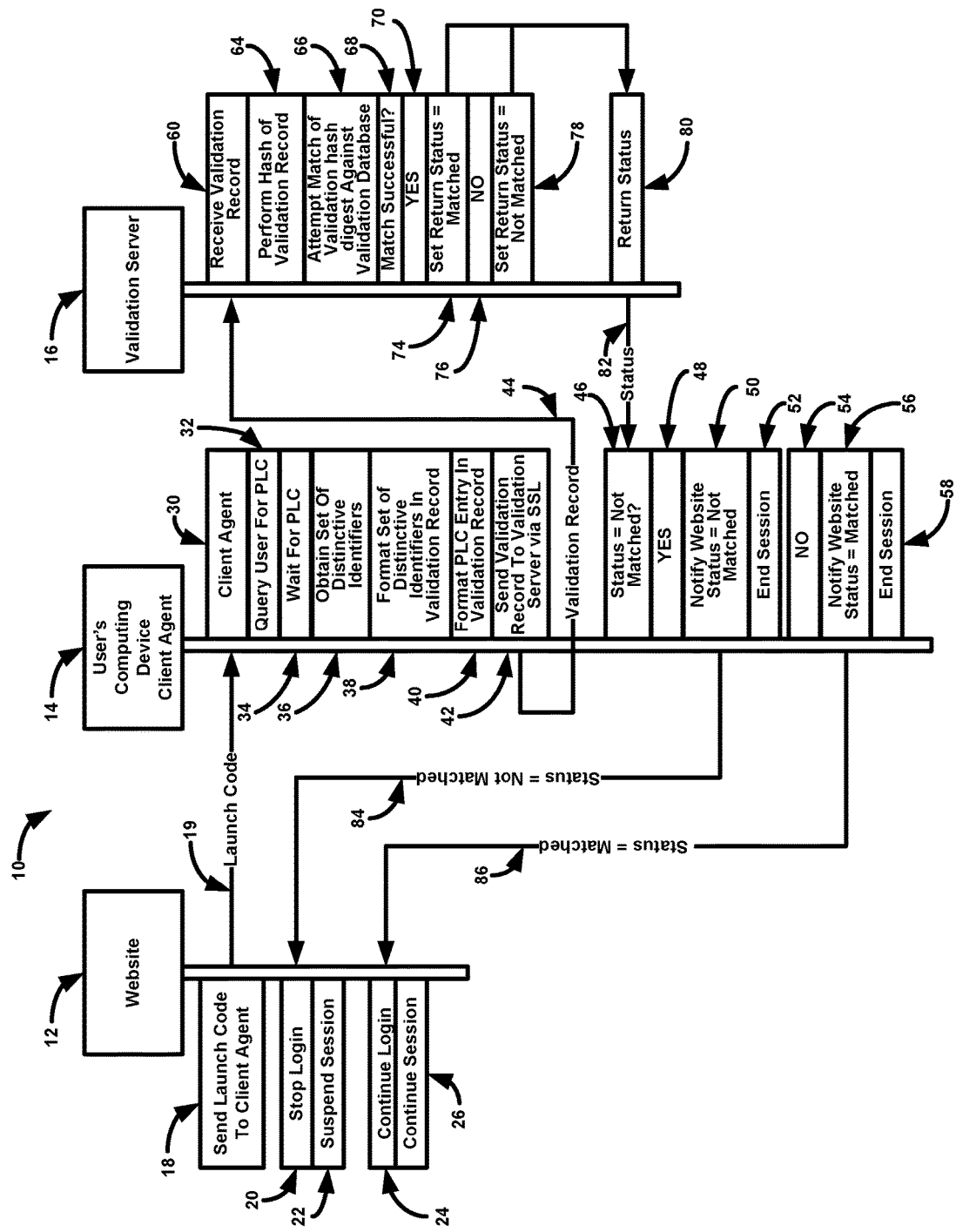
FIG. 1 depicts a logic flow of the present invention where the interaction between a use attempting to login to a website and the client agent executing on the user's computing device validates the computing device via the validation database server.

In a first exemplary embodiment, a method is disclosed for a Personal Launch Code. A first software program, referred to as a Client Agent is launched on the user's computing device. The Client Agent performs two basic functions. The first function of the Client Agent solicits a Personal Launch Code from the user. The Personal Launch Code consists of a user entry of alpha numeric, special characters and symbols and may contain one or more biomarkers such as a fingerprint, facial picture or other bio marker. The Personal Launch Code is not stored on a user's computing device nor ever compared to a matching Personal Launch Code residing in code or in a database residing on a local or remote website, database manager, or a remote gateway to an application residing on a local or remote website. In this embodiment, the Personal Launch Code is formatted into a validation record on a user's computing device where the validation record contains several specific identifiers that are serial numbers or identifiers of hardware and software modules residing on the user's computing device. The validation record of identifiers and the Personal Launch Code are transferred to a validation server residing on a local area network (LAN), a wide area network (WAN), or the internet. The validation server receives the validation record and performs a secure one-way hash using a hashing algorithm such as SHA-2 or SHA-3 with the resulting digest being referred to as the Anonymous Access Key (AAK). The hashed AAK contains no data that references the AAK back to a source computer. After the validation record has been hashed resulting in the creation of the AAK, the AAK is matched against a database of AAKs. The database of AAKs were created by a registration function of AAKs from several different users computing devices. If the current AAK is matched against one of the registered AAKs in the AAK database, a status will be returned to the calling computer device of TRUE. If the current AAK is NOT matched against one of the registered AAKs in the AAK database, a status will be returned to the calling computer device of FALSE.

In a related embodiment, the Client Agent is launched by a website being accessed by the user. The website will send a launch message to the user's computer resulting in the Client Agent being launched and started into execution.

In another related embodiment, the Website may solicit the Personal Launch Code entry and send it to the validation server which will append the received Personal Launch Code to the validation record sent by the Client Agent residing on the user's computing device.

In yet another related embodiment, a secure router may send a launch message to the user's computing device when an Internet of Things (IoT) application running on the user's computing device communicating with an IoT website attempts to connect to one of the user's IoT devices residing on the secure router.

In yet another related embodiment, the user may launch the Client Agent residing on the user's computing device. Once launched, the Client Agent may solicit the user to enter a Personal Launch Code which the Client Agent will append to the validation record prior to the validation record being transferred to the Validation Server.

DETAILED DESCRIPTION OF THE DRAWINGS

Now referencing FIG. 1 where 10 depicts a logic flow diagram of the invention. The logic flow diagram starts at Website 12 processing block 18, send launch code to client agent. Website 12 being cited here has received a request from a user login request to the website. Website 12 having knowledge of the workings of the present invention knows that the user's computing device 14 needs to be validated.

Website 12 will, at this time, send launch code signal 19 through the browser to the user's computing device. Launch code 19 causes Client Agent 30 residing on user's computing device 14 to begin execution. Client Agent 30 processing block 32 will query the user for their personal launch code then fall through to processing block 34 wait for PLC where a dialog box is displayed where the personal launch code is manually entered or where the personal launch code received in the form of a secure certificate is displayed. The personal launch code is known only to the user of the computer. The personal launch code may take the form of a string of numbers, alphabetic characters, a mix of alphabetic characters and numbers, or a biomarker such as a fingerprint scan, a facial scan, voice capture (digitized), iris scan, or retina, or any other type of biomarker. In the case of biomarkers that scan a fingerprint, user's face, digitized voice, iris scan, or retina scan, the actual scan of the fingerprint, face, voice, iris, or retina is not used as the personal launch code. Operating systems such as Apple's mobile OS or Android's Mobile OS instead return a secure certificate to the application requesting the scanned fingerprint, facial, iris, retina, vocal digital scan or any other biomarker which is composed of numbers and letters. These secure certificates are then used as the personal launch code 108, in validation record 110 FIG. 2. After the user has manually entered a personal launch code or the Client Agent has received a personal launch code in the form of a secure certificate is shown in the dialog box. Once a personal launch code has been received from the user or the retrieved by the Client Agent and displayed in the dialog box it will be moved to validation record 110 validation record entry 108.

After validation record 110 validation record entry 108 has been obtained, processing for Client Agent 30 will advance to processing block 36, obtain set of distinctive identifiers. This processing block will query a preselected set of hardware and software modules and read their serial numbers and will place the serial numbers into validation record 110 validation record entries 102 through 106 (distinctive identifier 1 through distinctive identifier 'n'). After the set of distinctive identifiers have been read and saved in validation record 110, processing will fall through to process block 38, format set of distinctive identifiers in validation record 110 after which processing will fall through to process block 40. Process block 40, format PLC entry in validation record will move the personal launch code received from the query to validation record 110 validation record entry 108 after which processing will fall through to process block 42. Process block 42, send validation record to validation server via SSL. SSL is a Secure Sockets Layer protocol that provides end to end encryption between computers residing on networks. The validation record is sent to validation server 16, processing block 60. Processing block 60, receive validation record receives the just transmitted validation record from User's Computing Device/Client Agent 14, processing block 42 after which processing will fall through to processing block 64.

Processing block 64, perform hash of validation record 110. A hash is at one-way encryption of a string or block of data. The resulting hash-digest cannot be decrypted. Nothing in the hash-digest can be discovered that would point back to any data that could be used to identify the type or identity of any distinctive identifiers or the person launch code that was used as the source data input into the hash algorithm.

After the hash algorithm has created the hash-digest, processing will fall through to processing block 66. Processing block 66, attempt match of validation hash-digest against validation database will query the validation database using the validation hash-digest for the query input. The result of the query to the validation database will be either true or false after which processing will fall through to processing block 68.

Processing block 68 match successful? Processing block 68 receives the result of the query to the validation database. If the result of the query was "TRUE", processing will fall through to processing block 70 where processing then falls through to processing block 74. Processing block 74 set return status=matched sets the status that will be returned to User's Computing Device/Client Agent 14, processing block 46 after which processing falls through to processing block 80 return status. If the status from the query was "FALSE", processing from processing block 68, match successful will fall through to processing block 76, "NO" after which processing will fall through to processing block 78, set return status=not matched sets the status that will be returned to User's Computing Device/Client Agent 14, processing block 46 after which processing falls through to processing block 80 return status.

Processing block 80 return status sends signal 82 status to User's Computing Device/Client Agent 14, processing block 46 status=not matched. If signal 82 status=not matched, processing falls through to processing block 48 YES after which processing falls through to processing block 50, notify website "status=not match" after which processing block 50 sends status signal 84 "status=not matched" to website 12/processing block 20 stop login. Process block 20 will notify the user that his computing device was not validated and the login session will be placed into suspension. If processing block 80 return status sends signal 86, status "status matched" to User's Computing Device/Client Agent 14, processing block 46 status=not matched and, the actual signal 82 status="matched", processing will fall through to processing block 54 "NO" after which processing will fall through to processing block 56 notify website status=matched after which processing block 56 sends status signal 86 "status=matched" to website 12/processing block 24 continue login. Process block 24 will notify the user that his computing device was validated and the login session will fall through to processing block 26 continue session.

Figure 2:
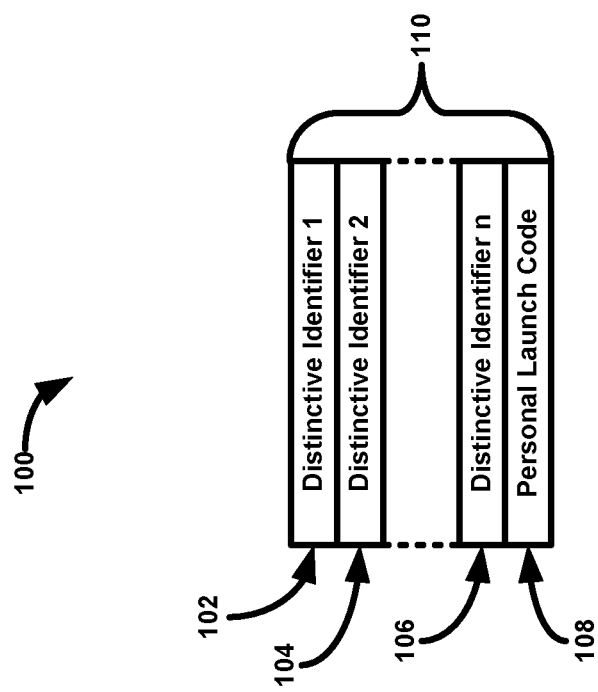
FIG. 2 depicts the validation record sent from the user's computing device to the validation server for validating the user's computing device.

Now referencing FIG. 2 where 100 depicts a variable length validation record constructed by the user's computing device/client agent 14. In this depiction, the validation record 110 shows the entries for distinctive identifiers 1 through "n". For computing devices such as PCs, the client agent 30 may have access to 20+ identifiers composed of serial number from hardware and software modules. Smart phone devices such as Android™ phones and Apple iPhones™ may only provide access to a very few hardware and software module. The last entry in the validation is the Personal Launch Code which may also be a variable length validation record entry.

Once the client agent obtains distinctive identifiers 1 through "n" and the Personal Launch Code, the record is sent to the validation database where it is hashed and used at the input to a query to match against the hashed records contained in the Validation Database.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory-based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification. Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein. Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method whereby a first software program executing on a user's computing device requests, said user to enter a Personal Launch Code (PLC), known only by a rightful account owner, and said PLC is then used as an element in the validation of the identity and authorization of said user's computing device to gain account access by integrating said PLC into the creation of an Anonymous Access Key (AAK), consisting of selected distinctive identifiers gathered by said first software program executing on said computing device and combined with the Personal Launch Code (PLC) entered by said user comprising:
   a. Launching said first software program executing on said computing device, and
   b. Said first software program displays a query visible to said user requesting said PLC be entered by said user, and
   c. Said first software program gathers selected distinctive identifiers from said computing device, consisting of unique identifiers representing hardware and software modules residing on said computing device, and
   d. Said first software program transmits said collected selected distinctive identifiers and said user entered PLC via the Internet to an online Validation Service, and
   e. Said online Validation Service receives said selected distinctive identifiers and said PLC and determines which selected distinctive identifiers are required to construct the Anonymous Access Key (AAK), and
   f. Said online Validation Service hashes said selected distinctive identifiers and said PLC into one or more hashed results, and
   g. Said online Validation Service then compares said one or more hashed results against its online database of hashed results and, if said one or more hashed results is matched against a stored hashed result in said online database of hashed results, access is granted to said computing device seeking access and
   h. If said one or more hashed results is not matched against any hashed result in said online database of hashed results, a status is returned to said first software program executing on said computing device that said computing device has not been validated and account access has been denied.

2. A method as in claim 1, whereby said first software program residing on said computing device is launched from an online website sending a launch message to said first software program on said computing device.

3. A method as in claim 1, whereby said PLC requested by said first software program consists of numbers, alpha numeric characters, symbols, and biomarkers.

4. A method as in claim 1, whereby said collected selected distinctive identifiers and said user entered PLC are securely erased from the memory and storage contents of said computing device and no longer exist on said computing device.

5. A method as in claim 1, whereby said PLC is different for each computing device registered by said user.

6. A method as in claim 1, whereby said PLC is identical for each computing device registered by said user.

7. A method as in claim 1, whereby an encryption algorithm is used in place of, or in addition to a hashing function used by said online validation service.

8. A method as in claim 1, whereby a user is prompted by said online Validation Service to enter a Personal Launch Code (PLC), known only by the rightful account owner, and said PLC is then used in the construction of an Anonymous Access Key (AAK) which is used in the validation of the identity and authorization of said user's computing device to gain account access.

* * * * *